US011761836B2

(12) United States Patent
Zhang et al.

(10) Patent No.: US 11,761,836 B2
(45) Date of Patent: Sep. 19, 2023

(54) SYSTEM AND METHOD FOR EVALUATING ATOMIZATION EFFICIENCY OF WIND-DRIVEN ATOMIZER

(71) Applicant: BEIJING RESEARCH CENTER OF INTELLIGENT EQUIPMENT FOR AGRICULTURE, Beijing (CN)

(72) Inventors: Ruirui Zhang, Beijing (CN); Liping Chen, Beijing (CN); Longlong Li, Beijing (CN); Gang Xu, Beijing (CN); Yao Wen, Beijing (CN); Tongchuan Yi, Beijing (CN)

(73) Assignee: BEIJING RESEARCH CENTER OF INTELLIGENT EQUIPMENT FOR AGRICULTURE, Beijing (CN)

( * ) Notice: Subject to any disclaimer, the term of this patent is extended or adjusted under 35 U.S.C. 154(b) by 275 days.

(21) Appl. No.: 17/296,426

(22) PCT Filed: Sep. 14, 2020

(86) PCT No.: PCT/CN2020/115137

§ 371 (c)(1),
(2) Date: May 24, 2021

(87) PCT Pub. No.: WO2021/082766

PCT Pub. Date: May 6, 2021

(65) Prior Publication Data

US 2022/0011181 A1 Jan. 13, 2022

(30) Foreign Application Priority Data

Oct. 30, 2019 (CN) ......................... 201911046100.7

(51) Int. Cl.

| | |
|---|---|
| ***G01L 3/26*** | (2006.01) |
| ***G01L 3/24*** | (2006.01) |
| ***G01M 9/04*** | (2006.01) |

(52) U.S. Cl.

CPC ................ *G01L 3/26* (2013.01); *G01L 3/247* (2013.01); *G01M 9/04* (2013.01)

(58) Field of Classification Search

None

See application file for complete search history.

(56) References Cited

U.S. PATENT DOCUMENTS

| | | | |
|---|---|---|---|
| 5,178,003 A | 1/1993 | Wesorick | |
| 9,116,068 B2 * | 8/2015 | Spandl .................... | G01M 9/04 |

(Continued)

FOREIGN PATENT DOCUMENTS

| | | |
|---|---|---|
| CN | 104568006 A | 4/2015 |
| CN | 104571123 A | 4/2015 |

(Continued)

OTHER PUBLICATIONS

Tang Q et al., Airspeed and pressure affect spray droplet spectrum from an aerial nozzle for fixed-wing application, Jul. 31, 2016, pp. 1-14, St. Louise, Proceedings of the 13th International Conference on Precision Agriculture, Missouri, USA.

(Continued)

*Primary Examiner* — Peter J Macchiarolo
*Assistant Examiner* — Jermaine L Jenkins
(74) *Attorney, Agent, or Firm* — IP & T GROUP LLP

(57) ABSTRACT

A system and a method for evaluating atomization efficiency of a wind-driven atomizer. The system for evaluating atomization efficiency of a wind-driven atomizer comprises a detection platform, a wind tunnel mechanism and a traction measurement mechanism are arranged above the detection platform, the traction measurement mechanism is disposed beside the wind outlet end of the wind tunnel mechanism, an atomizer mechanism and an atomization measurement mechanism are sequentially disposed on the detection platform along the direction of a wind field provided by the wind (Continued)

tunnel mechanism, and the atomizer mechanism is connected with the traction measurement mechanism. The system and the method may effectively evaluate the atomization efficiency and provide quantitative evaluation indicators for the detection of working performance of the wind-driven atomizer, and has the advantages of convenient operation, accurate detection, precise measurement results, and high reliability of evaluation indicators.

17 Claims, 2 Drawing Sheets

(56) References Cited

U.S. PATENT DOCUMENTS

| | | | | |
|---|---|---|---|---|
| 11,460,371 | B2 * | 10/2022 | Bissell | B05B 12/082 |
| 2006/0225489 | A1 | 10/2006 | Giles et al. | |
| 2022/0026329 | A1 * | 1/2022 | Chen | A01M 7/0096 |

FOREIGN PATENT DOCUMENTS

| | | | |
|---|---|---|---|
| CN | 104596755 | A | 5/2015 |
| CN | 105842132 | A | 8/2016 |
| CN | 106124156 | A | 11/2016 |
| CN | 106644847 | A | 5/2017 |
| CN | 106768819 | A | 5/2017 |
| CN | 107389513 | A | 11/2017 |
| CN | 109769788 | A | 5/2019 |
| CN | 110672937 | A | 1/2020 |
| CN | 110702365 | A | 1/2020 |
| WO | 2012023218 | A1 | 2/2012 |

OTHER PUBLICATIONS

Zhao C et al., Establishment and Experiment of Quadratic Residual Compensation Atomization Model of Electricity Atomizer, Transactions of the Chinese Society for Agricultural Machinery, Apr. 2020, pp. 19-37.

Guo Y et al., Research on the Atomization Characteristics of the Nozzle Controlled by PWM, Dec. 2019, pp. 145-150, Chinese Academic Journal Electronic Publishing House.

Tang, Q et al., Aerial Spray Nozzle Test in IEA-I High Speed Wind Tunnel, Jul. 2016, ASABE Annual International Meeting, Orlando, Florida.

Tang Q et al., Droplet spectra and high-speed wind tunnel evaluation of air induction nozzles, 2018, pp. 442-454, Higher Education Press.

Zhang R et al., Spraying atomization performance by pulse width modulated variable and droplet deposition characteristics in wind tunnel, Transactions of the Chinese Society for Agricultural Engineering, Feb. 2019, pp. 42-51, vol. 35, No. 6.

Zhang R et al., Effect of spray adjuvant types and concentration on nozzle atomization, Transactions of the Chinese Society for Agricultural Engineering, Oct. 2018, pp. 36-43, vol. 34, No. 20.

* cited by examiner

SYSTEM AND METHOD FOR EVALUATING ATOMIZATION EFFICIENCY OF WIND-DRIVEN ATOMIZER

CROSS-REFERENCE TO RELATED APPLICATION

The present application is a national stage application of PCT/CN2020/115137 filed on Sep. 14, 2020, which claims priority to Chinese Patent Application No. 201911046100.7 filed on Oct. 30, 2019, entitled "System and Method for Evaluating Atomization Efficiency of Wind-Driven Atomizer", which is hereby incorporated by reference in its entirety.

FIELD OF TECHNOLOGY

The present application relates to the technical field of wind-driven atomization for aerial application of pesticides, in particular to a system and a method for evaluating atomization efficiency of a wind-driven atomizer.

BACKGROUND

Aerial pesticide application of agricultural aircrafts has received considerable attention in the field of agricultural plant protection since they have the advantages of fast flying speed, high spraying operation efficiency, and strong ability to respond to sudden disasters.

In the traditional application operation of pesticides, the rotation of the atomizer driven by an aircraft in flight will cause great wind resistance to the aircraft and thus the aircraft's flight energy consumption as well as the cost of fuel for aircraft flight are increased. The atomization efficiency of a wind-driven atomizer, which is the proportional relationship between the working-done value of the atomizer being dragged and the atomization quality of a unit volume of liquid pesticide atomized by the atomizer during the flight of the aircraft, represents a degree of kinetic energy consumed by the atomizer when atomizing the unit volume of liquid pesticide to a certain droplet size. However, in the prior art, there is no relevant system and method for evaluating atomization efficiency, and it is impossible to provide quantitative evaluation indicators for the detection of the working performance of the wind-driven atomizer.

SUMMARY

The present application is intended to address at least one of the technical problems in the prior art. To this end, the present application provides a system for evaluating atomization efficiency of a wind-driven atomizer, which effectively evaluates the atomization efficiency and provides quantitative evaluation indicators for the detection of the working performance of the wind-driven atomizer.

The present application also provides a method for evaluating atomization efficiency of the wind-driven atomizer.

According to an embodiment of a first aspect of the present application, the system for evaluating atomization efficiency of a wind-driven atomizer includes a detection platform; a wind tunnel mechanism and a traction measurement mechanism are arranged above the detection platform, the traction measurement mechanism is disposed beside a wind outlet end of the wind tunnel mechanism, an atomizer mechanism and an atomization measurement mechanism are sequentially disposed on the detection platform along the direction of a wind field provided by the wind tunnel mechanism, and the atomizer mechanism is connected with the traction measurement mechanism.

For the system for evaluating atomization efficiency of a wind-driven atomizer according to the embodiment of the present application, by disposing the wind tunnel mechanism, the traction measurement mechanism, the atomizer mechanism, and the atomization measurement mechanism above the detection platform, the wind tunnel mechanism is configured to provide a wind field with a set wind speed, the traction measurement mechanism is configured to detect a traction force generated by the atomizer mechanism at the set wind speed, and the atomization measurement mechanism is configured to detect the atomization parameters of the atomizer mechanism at the set wind speed, and then calculate the atomization efficiency at the set wind speed and a set application rate of pesticides, which provides quantitative evaluation indicators for the detection of the working performance of the wind-driven atomizer.

According to an embodiment of the present application, the wind tunnel mechanism includes a horizontally arranged tunnel body, and a blower motor is disposed at an air inlet end of the tunnel body.

According to an embodiment of the present application, the traction measurement mechanism includes a stress detector, a stress detector mounting frame, a mounting crossbar and a support rod, wherein the stress detector mounting frame has a fixed end mounted on the detection platform, the stress detector is mounted on a free end of the stress detector mounting frame, a detection end of the stress detector is connected to one end of the mounting crossbar, the other end of the mounting crossbar is connected to a free end of the support rod by bearings, an axis of the mounting crossbar is perpendicular to an axis of the support rod and the support rod has a fixed end mounted on the detection platform.

According to an embodiment of the present application, the atomizer mechanism includes an atomizer mounted on the mounting crossbar.

According to an embodiment of the present application, an axis of the atomizer coincides with an axis of the tunnel body.

According to an embodiment of the present application, the atomizer is provided with blades at an end proximal to the wind outlet end of the wind tunnel mechanism, and is provided with a droplet outlet at an end far away from the wind outlet end of the wind tunnel mechanism.

According to an embodiment of the present application, the atomization measurement mechanism includes a droplet size analyzer mounting frame, a first droplet size analyzer and a second droplet size analyzer, wherein the droplet size analyzer mounting frame is mounted on the detection platform and is close to the droplet outlet of the atomizer, and the first droplet size analyzer and the second droplet size analyzer are oppositely arranged on both sides of the droplet size analyzer mounting frame and used to detect atomization parameters of droplets of the atomizer.

According to an embodiment of the present application, the detection platform is further provided with a liquid pesticide supply mechanism including a liquid pesticide storage tank and a liquid pesticide supply pump, wherein a liquid inlet of the liquid pesticide supply pump is in communication with the liquid pesticide storage tank, and a liquid outlet of the liquid pesticide supply pump is in communication with the atomizer mechanism.

According to an embodiment of the present application, a flow rate sensor is disposed on a communication pipe between the liquid pesticide supply pump and the atomizer mechanism.

The method for evaluating atomization efficiency of a wind-driven atomizer according to an embodiment of a second aspect of the present application includes the following steps:

starting a wind tunnel mechanism to generate a wind field with a wind speed of V;

starting a traction measurement mechanism, measuring a traction force F generated by an atomizer mechanism at the above wind speed, and calculating an energy consumption power of the atomizer mechanism $P=F\times V$;

allowing the atomizer mechanism and an atomization measurement mechanism to operate, and measuring, by the atomization measurement mechanism, the atomization parameters Dv0.1, Dv0.5, Dv0.9;

calculating a size distribution span $RS=(Dv0.9-Dv0.1)/Dv0.5$ of atomized droplets of the atomizer mechanism; and calculating an atomization efficiency $\eta=1/(d\times\Delta p\times RS)$ of the atomizer mechanism, where, $$d=Dv0.5/250\ \mu m,$$

$\Delta p=P/P_0$, $P_0$ is the energy consumption power of the atomizer mechanism when the wind speed is 120 km/h and the application rate of pesticides is 0.

The method for evaluating atomization efficiency according to the embodiment of the present application has the advantages of convenient operation, accurate detection, precise measurement results, and high reliability of evaluation indicators.

Additional aspects and advantages of the present application will be partially given in the following description, and some thereof will become obvious from the following description, or be understood through the practice of the present application.

BRIEF DESCRIPTION OF THE DRAWINGS

In order to more clearly illustrate technical solutions disclosed in the embodiments of the present application or the prior art, the drawings needed in the descriptions of the embodiments or the prior art will be briefly described below. Obviously, the drawings in the following description only show certain embodiments of the present application, and other drawings can be obtained according to the drawings without any creative work for those skilled in the art.

REFERENCE NUMERALS

Figure 1:
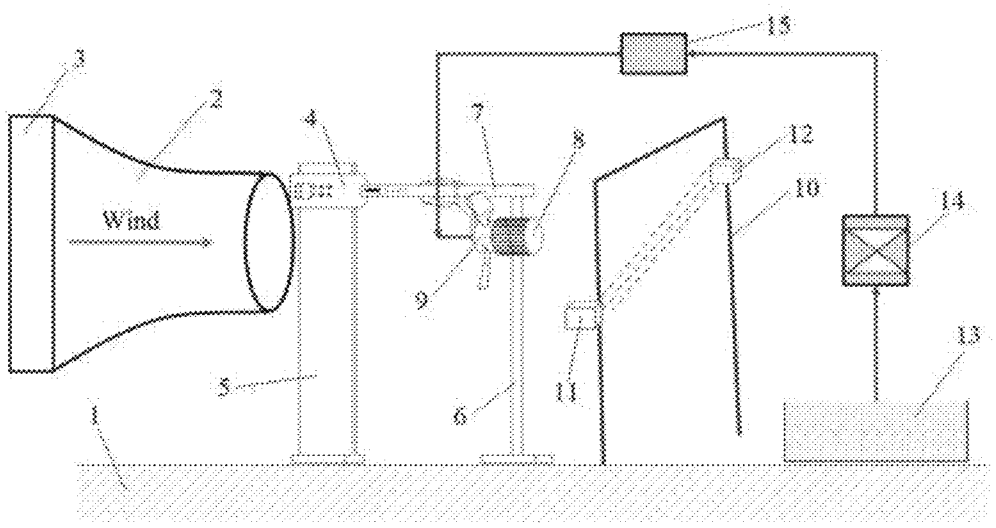
FIG. 1 is a schematic diagram of a system for evaluating atomization efficiency of a wind-driven atomizer according to an embodiment of the present application.

| | |
|---|---|
| 1 | detection platform |
| 2 | wind tunnel |
| 3 | blower motor |
| 4 | stress detector |
| 5 | stress detector mounting frame |

-continued

| | |
|---|---|
| 6 | support rod |
| 7 | mounting crossbar |
| 8 | atomizer |
| 9 | blade |
| 10 | droplet size analyzer mounting frame |
| 11 | first droplet size analyzer |
| 12 | second droplet size analyzer |
| 13 | liquid pesticide storage tank |
| 14 | liquid pesticide supply pump |
| 15 | flow rate sensor. |

DETAILED DESCRIPTION

Embodiments of the present application are further described in detail below in conjunction with the drawings and embodiments. The following embodiments are intended to illustrate the present application, but are not intended to limit the scope of the present application.

In the description of the embodiments of the present application, it should be noted that the orientation or positional relationships indicated by terms such as "center", "longitudinal", "lateral", "upper", "lower", "front", "rear", "left", "right", "vertical", "horizontal", "top", "bottom", "inside", "outside" are based on the orientation or positional relationship shown in the drawings, and are intended only to facilitate the description of embodiments of the present application and simplify the description, rather than to indicate or imply that a device or component referred to must have a particular orientation, or be constructed and operated in a particular orientation, and thus can not to be construed as limiting the embodiments of the present application. Moreover, the terms "first", "second", "third", and the like are used for descriptive purposes only and are not to be construed as indicating or implying relative importance.

In the description of the embodiments of the present application, it should be noted that unless otherwise clearly specified and defined, the terms "connected with", and "connected" shall be understood broadly, for example, it may be either fixedly connected or detachably connected, or may be integrally connected; it may be mechanically connected, or electrically connected; it may be directly connected, or indirectly connected through an intermediary. The specific meanings of the terms above in embodiments of the present application can be understood by a person skilled in the art in accordance with specific conditions.

In the embodiments of the present application, unless otherwise clearly specified and defined, the first feature being located "on" or "under" the second feature means that the first feature is in direct contact with the second feature or the first feature is in contact with the second feature by an intermediary. Also, the first feature being located "on", "above" and "on top of" the second feature may mean that the first feature is directly or diagonally above the second feature, or it simply means that the level of the first feature is higher than the second feature. The first feature being located "under", "below" and "on bottom of" the second feature may mean that the first feature is directly or diagonally below the second feature, or it simply means that the level of the first feature is lower than the second feature.

In the description of this specification, descriptions with reference to the terms "one embodiment", "some embodiments", "examples", "specific examples", or "some examples" etc. mean that specific features, structures, materials or characteristics described in conjunction with the embodiment or example are included in at least one embodiment or example of the embodiments of the present application. In this specification, the schematic expressions of the above terms do not necessarily refer to the same embodiment or example. Also, the described specific features, structures, materials or characteristics may be combined in any one or more embodiments or examples in a suitable manner. In addition, those skilled in the art may integrate and combine the different embodiments or examples and the features of the different embodiments or examples described in this specification without contradicting each other.

Figure 2:
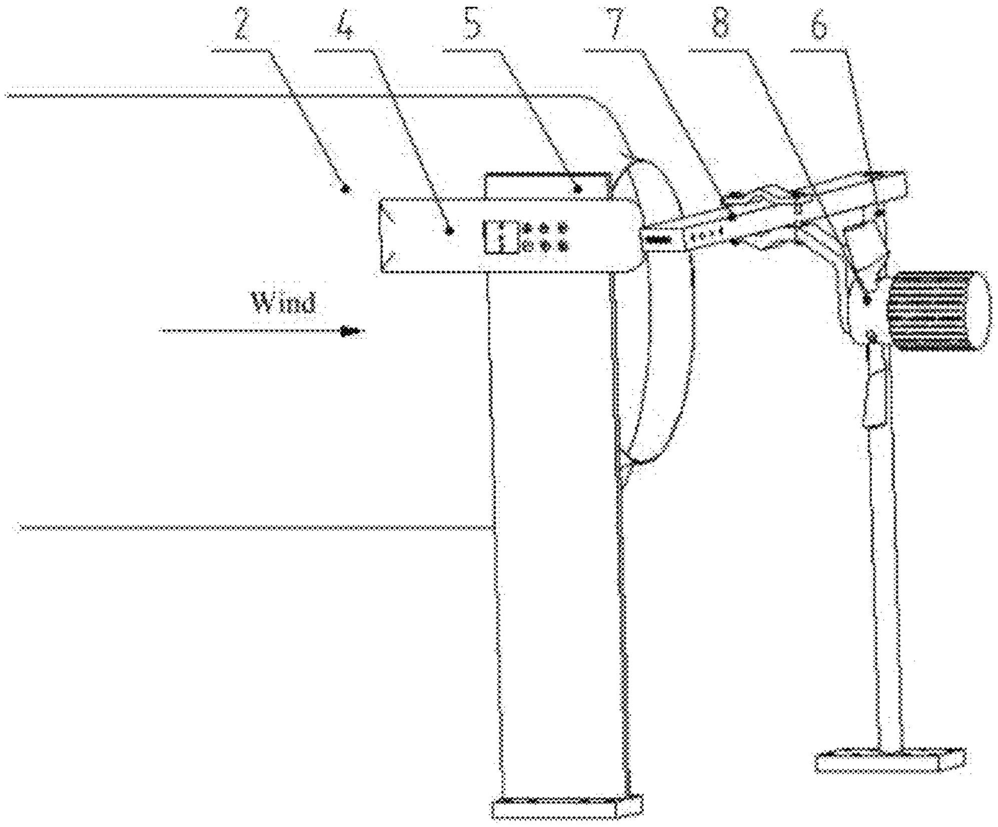
FIG. 2 is a schematic diagram shows assembly relationship between an atomizer mechanism and a traction measurement mechanism of a system for evaluating atomization efficiency of a wind-driven atomizer according to an embodiment of the present application.

As shown in FIGS. 1 and 2, an embodiment of the present application provides a system for evaluating atomization efficiency of a wind-driven atomizer, including a detection platform 1, a wind tunnel mechanism and a traction measurement mechanism are arranged above the detection platform 1, the traction measurement mechanism is disposed beside a wind outlet end of the wind tunnel mechanism, an atomizer mechanism and an atomization measurement mechanism are sequentially disposed on the detection platform 1 along the direction of a wind field provided by the wind tunnel mechanism, and the atomizer mechanism is connected with the traction measurement mechanism. By disposing the wind tunnel mechanism, the traction measurement mechanism, the atomizer mechanism, and the atomization measurement mechanism above the detection platform 1, the wind tunnel mechanism is configured to provide a wind field with a set wind speed, the traction measurement mechanism is configured to detect a traction force generated by the atomizer mechanism at the set wind speed, and the atomization measurement mechanism is configured to detect the atomization parameters of the atomizer mechanism at the set wind speed, and then calculate the atomization efficiency at the set wind speed, which provides quantitative evaluation indicators for the detection of the working performance of the wind-driven atomizer.

In an embodiment of the present application, the wind tunnel mechanism includes a horizontally arranged tunnel body 2, and a blower motor 3 is disposed at an air inlet end of the tunnel body 2. It may be understandable that the tunnel body 2 is a horizontally arranged hollow cylindrical structure, the blower motor 3 is disposed at the left end of the tunnel body 2 and the right end of the tunnel body 2 is the wind outlet end. It is worth mentioning that in order to facilitate the adjustment of the wind speed in the wind field, the tunnel body 2 has an inner diameter that gradually decreases from left to right. By adjusting the frequency of the blower motor 3, the wind speed at the wind outlet end of the tunnel body 2 may be adjusted to realistically simulate the flight environment in the process of aerial application of pesticides in agricultural filed. In this embodiment, the wind tunnel mechanism may provide a wind field with a wind speed of 2~260 km/h.

In an embodiment of the present application, the traction measurement mechanism includes a stress detector 4, a stress detector mounting frame 5, a mounting crossbar 7 and a support rod 6, wherein the stress detector mounting frame 5 has a fixed end mounted on the detection platform 1, the stress detector 4 is mounted on a free end of the stress detector mounting frame 5, a detection end of the stress detector 4 is connected to one end of the mounting crossbar 7, the other end of the mounting crossbar 7 is connected to a free end of the support rod 6 by bearings, an axis of the mounting crossbar 7 is perpendicular to an axis of the support rod 6, and the support rod 6 has a fixed end mounted on the detection platform 1. It may be understandable that the stress detector mounting frame 5 is mounted vertically on the detection platform 1, and is located on one side of the tunnel body 2 proximal to the wind outlet end of the tunnel body 2 to prevent the stress detector mounting frame 5 from blocking the wind outlet of the tunnel body 2. The stress detector 4 is mounted on an outer side of the upper end of the stress detector mounting frame 5, also to prevent the stress detector 4 from generating resistance to the wind and affecting the detection structure. The support rod 6 is disposed vertically on the detection platform 1, and the mounting crossbar 7 is horizontally arranged; a first end of the mounting crossbar 7 is provided with a perforation in which bearings are provided, a free end of the support rod 6 is provided with an articulated column penetrating inside a bearing hole of the bearing, which ensures that the mounting crossbar 7 may rotate horizontally around the articulated column. It is worth mentioning that the diameter of the articulated column is smaller than the diameter of the support rod 6 so that the free end of the support rod 6 supports the first end of the mounting crossbar 7. In an example, a tapered roller bearing adapted to the articulated column is disposed in the perforation, which reduces the friction between the hinged column and the perforation and improves the accuracy of stress detection.

In an embodiment of the present application, the atomizer mechanism includes an atomizer 8 mounted on the mounting crossbar 7. It may be understandable that a second end of the mounting crossbar 7 is connected to the detection end of the stress detector 4, and the atomizer 8 is mounted in the middle of the mounting crossbar 7. It is worth mentioning that the wind blowing from the tunnel body 2 blows the atomizer 8 and generates traction on the atomizer 8 along the direction of the wind field, so as to drive the atomizer 8 to move to the right. At the same time, the mounting crossbar 7 is driven by the atomizer 8 to rotate horizontally to the right around the axis of the support rod 6, the second end of the mounting crossbar 7 drives the detection end of the stress detector 4 to move, and then the stress detector 4 reads the detected stress value.

In an embodiment of the present application, an axis of the atomizer 8 coincides with an axis of the tunnel body 2. It may be understandable that, the atomizer 8 is disposed at the wind outlet end of the tunnel body 2 to reduce wind speed loss, so as to ensure the accuracy of wind speed detection, and therefore the accuracy of detection results.

In an embodiment of the present application, the atomizer 8 is provided with blades 9 at an end proximal to the wind outlet end of the wind tunnel mechanism, and is provided with a droplet outlet at an end far away from the wind outlet end of the wind tunnel mechanism. It may be understandable that the blades 9 of the atomizer 8 are rotated by the wind of the wind field, so that the liquid pesticide in the atomizer 8 is converted into droplets and blown away after being atomized, and then the pesticides are applied. In this embodiment, the initial state is that the angle of attack of the blades 9 is 25 degrees, and the wind speed of the wind field provided by the wind tunnel mechanism is 120 km/h.

In an embodiment of the present application, the atomization measurement mechanism includes a droplet size analyzer mounting frame 10, a first droplet size analyzer 11 and a second droplet size analyzer 12, wherein the droplet size analyzer mounting frame 10 is mounted on the detection platform 1 and is close to the droplet outlet of the atomizer 8, and the first droplet size analyzer 11 and the second droplet size analyzer 12 are oppositely arranged on both sides of the droplet size analyzer mounting frame 10 and used to detect atomization parameters of droplets of the atomizer 8. It may be understandable that the droplet size analyzer mounting frame 10 includes two vertical brackets and a horizontal bracket. The horizontal bracket is respectively connected to upper ends of the two vertical brackets, and lower ends of the two vertical brackets are disposed on the detection platform 1. The first droplet size analyzer 11 and the second droplet size analyzer 12 are respectively arranged on two vertical brackets, and the detection ends of the first droplet size analyzer 11 and the second droplet size analyzer 12 are arranged opposite to each other to synchronously adjust vertical heights of the first droplet size analyzer 11 and the second droplet size analyzer 12 for the purpose of detecting parameters of droplets atomized by the atomizer 8 passing between the first droplet size analyzer 11 and the second droplet size analyzer 12, thereby ensuring the measurement of full range of droplet sizes.

In an embodiment of the present application, the detection platform 1 is further provided with a liquid pesticide supply mechanism including a liquid pesticide storage tank 13 and a liquid pesticide supply pump 14, wherein a liquid inlet of the liquid pesticide supply pump 14 is in communication with the liquid pesticide storage tank 13, and a liquid outlet of the liquid pesticide supply pump 14 is in communication with the atomizer 8 of the atomizer mechanism. It may be understandable that the liquid pesticide supply pump 14 provides power for inputting the liquid pesticide inside the liquid pesticide storage tank 13 into the atomizer 8.

In an embodiment of the present application, a flow rate sensor 15 is disposed on a communication pipe between the liquid pesticide supply pump 14 and the atomizer 8 of the atomizer mechanism. It may be understandable that the flow rate of the liquid pesticide is monitored in real time by the flow rate sensor 15.

An embodiment of the present application also provides a method for evaluating atomization efficiency of a wind-driven atomizer, including the following steps:

- starting the wind tunnel mechanism to generate a wind field with a wind speed of V;
- starting the liquid pesticide supply mechanism, controlling the application rate of pesticides, setting a flow rate q of the liquid pesticide, and simulating application operation requirements;
- starting the traction measurement mechanism, measuring a traction force F generated by the atomizer mechanism at the above wind speed, and calculating an energy consumption power of the atomizer mechanism $P=F\times V$;
- allowing the atomizer mechanism and the atomization measurement mechanism to operate, and measuring, by the atomization measurement mechanism, the atomization parameters Dv0.1, Dv0.5, Dv0.9;
- calculating a size distribution span $RS=(Dv0.9-Dv0.1)/DV0.5$ of atomized droplets of the atomizer mechanism; and
- calculating an atomization efficiency $\eta=1/(d\times\Delta p\times RS)$ of the atomizer mechanism, where, $$d=Dv0.5/250\ \mu m,$$

- $\Delta p=P/P_0$, $P_0$ is the energy consumption power of the atomizer mechanism when the wind speed is 120 km/h and the application rate of pesticides is 0.

Where $V_0$=120 km/h, the angle of attack of blades at 25 degrees, and the application flow rate at 0 are taken as an initial state, the initial traction force $F_0$ is detected, and $P_0$ is calculated by $P_0=F_0\times120$ km/h.

Among the atomization parameters Dv0.1, Dv0.5, Dv0.9, Dv0.1 means that the sum of the volume of droplets having a diameter smaller than the diameter corresponding to Dv0.1 accounts for 10% of the total volume of all droplets; Dv0.5 means that the sum of the volume of droplets having a diameter smaller than the diameter corresponding to Dv0.5 accounts for 50% of the total volume of all droplets; and Dv0.9 means that the sum of the volume of droplets having a diameter smaller than the diameter corresponding to Dv0.9 accounts for 90% of the total volume of all droplets.

The atomization efficiency η under various wind speeds is detected by changing the wind speed V of the wind field generated by the wind tunnel mechanism according to the application rate of pesticides set by simulation and the set flow rate q of liquid pesticide. The larger the value of η, the greater the atomization efficiency of the atomizer, and vice versa, i.e., the smaller the value of η, the lower the atomization efficiency of the atomizer.

Figure 3:
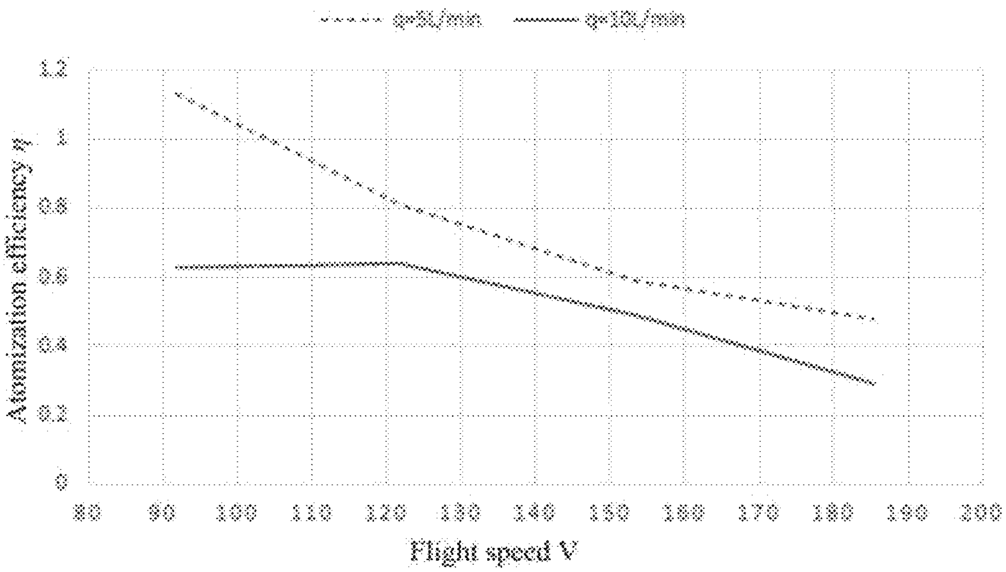
FIG. 3 shows a curve of an atomization efficiency measured by a method for evaluating atomization efficiency of a wind-driven atomizer according to an embodiment of the present application.

$\eta_i(V_i, q_i)$ is plotted in a plane coordinate system to obtain the atomization efficiency curve $q=f(V)$ of the atomizer. Curves of different wind speeds V in the wind field and the atomization efficiency η under the condition that the flow rate q of the liquid pesticide is set to 5 L/min and 10 L/min, are respectively shown in FIG. 3.

The method for evaluating atomization efficiency of the embodiment of the present application has the advantages of convenient operation, accurate detection, precise measurement results, and high reliability of the evaluation indicators.

The implementations above are only used to illustrate the present application, but not to limit the present application. Although the present application has been described in detail with reference to the embodiments, those skilled in the art should understand that various combinations, modifications, or equivalent substitutions of the technical solutions of the present application do not depart from the spirit and scope of the technical solutions of the present application, and all of them should be covered in the scope of the claims of the present application.

The invention claimed is:

1. A system for evaluating atomization efficiency of a wind-driven atomizer, comprising a detection platform; a wind tunnel mechanism and a traction measurement mechanism that are arranged above the detection platform, wherein the traction measurement mechanism is disposed beside a wind outlet end of the wind tunnel mechanism, an atomizer mechanism and an atomization measurement mechanism are sequentially disposed on the detection platform along the direction of a wind field provided by the wind tunnel mechanism, and the atomizer mechanism is connected with the traction measurement mechanism; and the traction measurement mechanism comprises a stress detector, a stress detector mounting frame, a mounting crossbar and a support rod, wherein the stress detector mounting frame has a fixed end mounted on the detection platform, the stress detector is mounted on a free end of the stress detector mounting frame, a detection end of the stress detector is connected to one end of the mounting crossbar, the other end of the mounting crossbar is connected to a free end of the support rod by bearings, an axis of the mounting crossbar is perpendicular to an axis of the support rod, and the support rod has a fixed end mounted on the detection platform.

2. The system for evaluating atomization efficiency of a wind-driven atomizer of claim 1, wherein the wind tunnel mechanism comprises a horizontally arranged tunnel body, and a blower motor is disposed at an air inlet end of the tunnel body.

3. An evaluation method of the system for evaluating atomization efficiency of a wind-driven atomizer of claim 2, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency η=1/(d×Δp×RS) of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

4. The system for evaluating atomization efficiency of a wind-driven atomizer of claim 1, wherein the atomizer mechanism comprises an atomizer mounted on the mounting crossbar.

5. The system for evaluating atomization efficiency of a wind-driven atomizer of claim 4, wherein an axis of the atomizer coincides with an axis of the tunnel body.

6. The system for evaluating atomization efficiency of a wind-driven atomizer of claim 5, wherein the atomizer is provided with blades at an end proximal to the wind outlet end of the wind tunnel mechanism, and is provided with a droplet outlet at an end far away from the wind outlet end of the wind tunnel mechanism.

7. The system for evaluating atomization efficiency of a wind-driven atomizer of claim 6, wherein the atomization measurement mechanism comprises a droplet size analyzer mounting frame, a first droplet size analyzer and a second droplet size analyzer, wherein the droplet size analyzer mounting frame is mounted on the detection platform and is close to the droplet outlet of the atomizer, and the first droplet size analyzer and the second droplet size analyzer are oppositely arranged on both sides of the droplet size analyzer mounting frame to detect atomization parameters of droplets of the atomizer.

8. An evaluation method of the system for evaluating atomization efficiency of a wind-driven atomizer of claim 7, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency η=1/(d×Δp×RS) of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

9. An evaluation method of the system for evaluating atomization efficiency of a wind-driven atomizer of claim 4, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency η=1/(d×Δp×RS) of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

10. An evaluation method of the system for evaluating atomization efficiency of a wind-driven atomizer of claim 5, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency η=1/(d×Δp×RS) of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

11. An evaluation method of the system for evaluating atomization efficiency of a wind-driven atomizer of claim 6, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency $\eta=1/(d\times\Delta p\times RS)$ of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

12. The system for evaluating atomization efficiency of a wind-driven atomizer of claim 1, wherein the detection platform is further provided with a liquid pesticide supply mechanism including a liquid pesticide storage tank and a liquid pesticide supply pump, wherein a liquid inlet of the liquid pesticide supply pump is in communication with the liquid pesticide storage tank, and a liquid outlet of the liquid pesticide supply pump is in communication with the atomizer mechanism.

13. The system for evaluating atomization efficiency of a wind-driven atomizer of claim 12, wherein a flow rate sensor is disposed on a communication pipe between the liquid pesticide supply pump and the atomizer mechanism.

14. An evaluation method of the system for evaluating atomization efficiency of a wind-driven atomizer of claim 13, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency $\eta=1/(d\times\Delta p\times RS)$ of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

15. An evaluation method of the system for evaluating atomization efficiency of a wind-driven atomizer of claim 12, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency $\eta=1/(d\times\Delta p\times RS)$ of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

16. An evaluation method of the system for evaluating atomization efficiency of a wind-driven atomizer of claim 1, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency $\eta=1/(d\times\Delta p\times RS)$ of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

17. An evaluation method of the system for evaluating atomization efficiency of a wind-driven atomizer of claim 1, comprising the following steps:

starting the wind tunnel mechanism to generate a wind field with a wind speed of V;

starting the traction measurement mechanism, measuring a traction force F generated by the atomizer mechanism at the above wind speed, and calculating an energy consumption power of the atomizer mechanism P=F×V;

allowing the atomizer mechanism and the atomization measurement mechanism to operate, and measuring, by the atomization measurement mechanism, the atomization parameters Dv0.1, Dv0.5, Dv0.9;

calculating a size distribution span RS=(Dv0.9−Dv0.1)/Dv0.5 of atomized droplets of the atomizer mechanism; and calculating an atomization efficiency $\eta=1/(d\times\Delta p\times RS)$ of the atomizer mechanism, wherein, $$d=Dv0.5/250\ \mu m,$$

$\Delta p=P/P_0$, $P_0$ is the energy consumption power of the atomizer mechanism when the wind speed is 120 km/h and the application rate of pesticides is 0.

* * * * *